United States Patent [19]

Goodale

[11] 3,886,857
[45] June 3, 1975

[54] APPARATUS FOR CORING CAULIFLOWER HEADS

[76] Inventor: Richard J. Goodale, P.O. Box 268, Watsonville, Calif. 95076

[22] Filed: Apr. 18, 1973

[21] Appl. No.: 352,181

[52] U.S. Cl. .................. 99/563; 99/642; 99/643
[51] Int. Cl. ............................ A23n 15/02
[58] Field of Search .................. 99/544–548, 99/537, 552, 560, 561, 562, 592, 635, 637, 642, 643, 563

[56] References Cited
UNITED STATES PATENTS

| | | | |
|---|---|---|---|
| 2,788,037 | 4/1957 | Carter | 99/546 |
| 3,396,766 | 8/1968 | Perkins | 99/547 |
| 3,612,124 | 10/1971 | Cunningham et al. | 99/547 X |
| 3,646,977 | 3/1972 | Goodale | 99/635 |
| 3,738,257 | 6/1973 | Manfre et al. | 99/545 |
| 3,754,470 | 8/1973 | Console | 99/544 |

Primary Examiner—John W. Huckert
Assistant Examiner—Charles Gorenstein
Attorney, Agent, or Firm—Ben J. Chromy; Gerald L. Moore

[57] ABSTRACT

This apparatus comprises a turret having a plurality of jaws attached thereto for receiving the cauliflower heads to be cored, said jaws being rotated through a plurality of stations starting with a loading station at which a cauliflower head is inserted between the open jaws which grip the cauliflower head and carry it to the next station at which crossed blades are inserted into the cauliflower head to divide it into quadrants and at the same time the upper part of the stem is severed from the cauliflower head. The cauliflower head is then rotated to the next station at which a rotatable coring device is lowered into the stem end of the cauliflower head and the core removed therefrom in the form of thin shavings. The cauliflower head is then rotated by the turret to the discharge station at which the jaws gripping the head are open to release it. The several sets of jaws provided to the turret repeatedly proceed through the above described sequence during the rotation of the turret.

5 Claims, 6 Drawing Figures

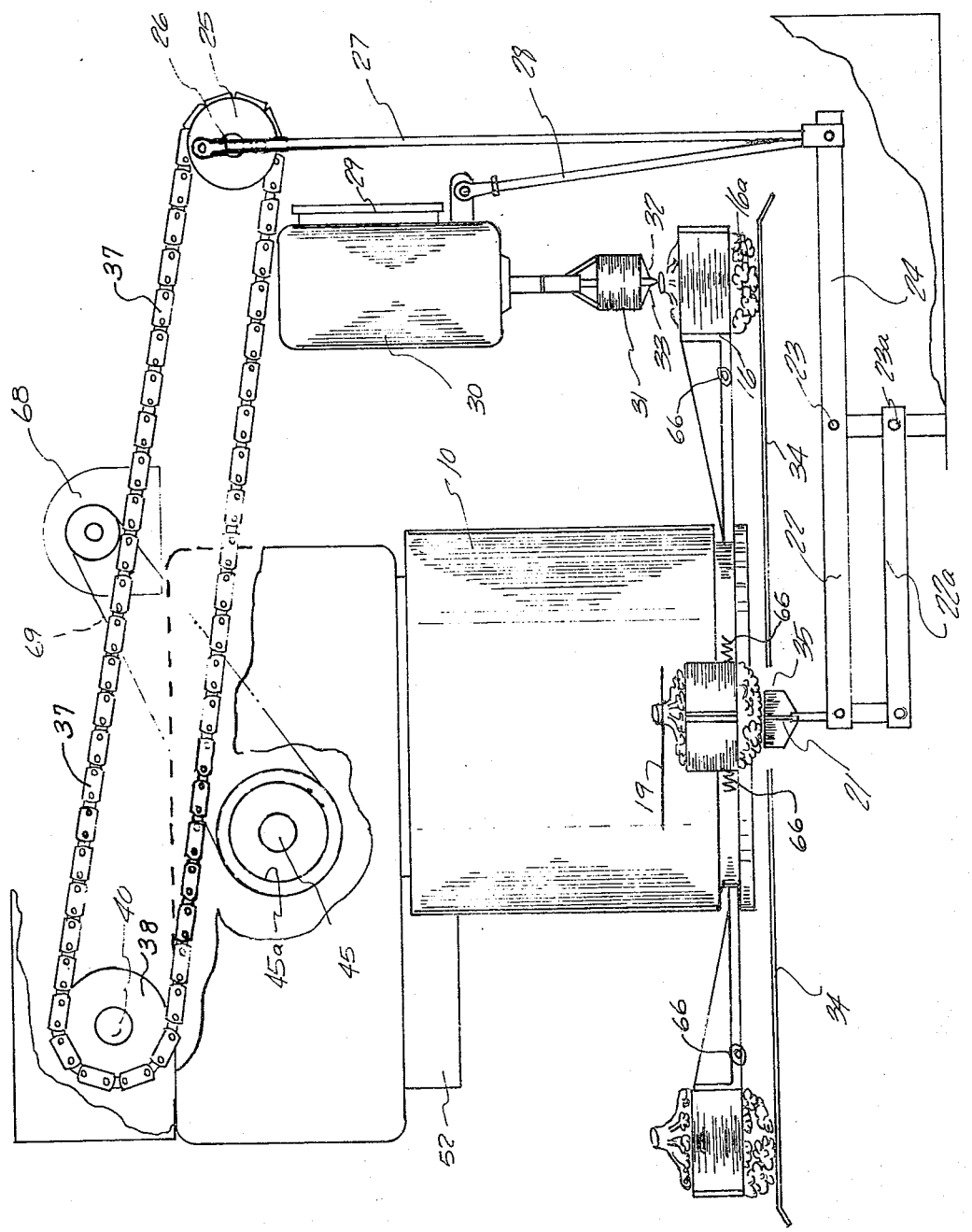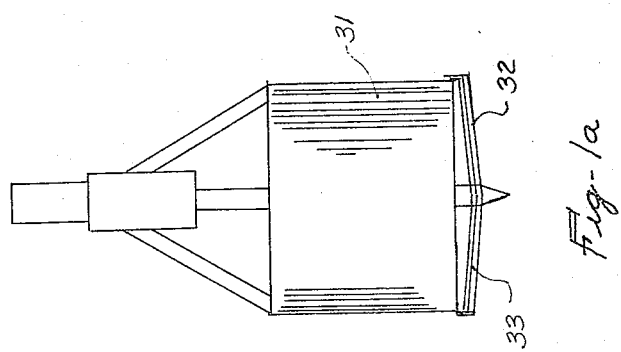

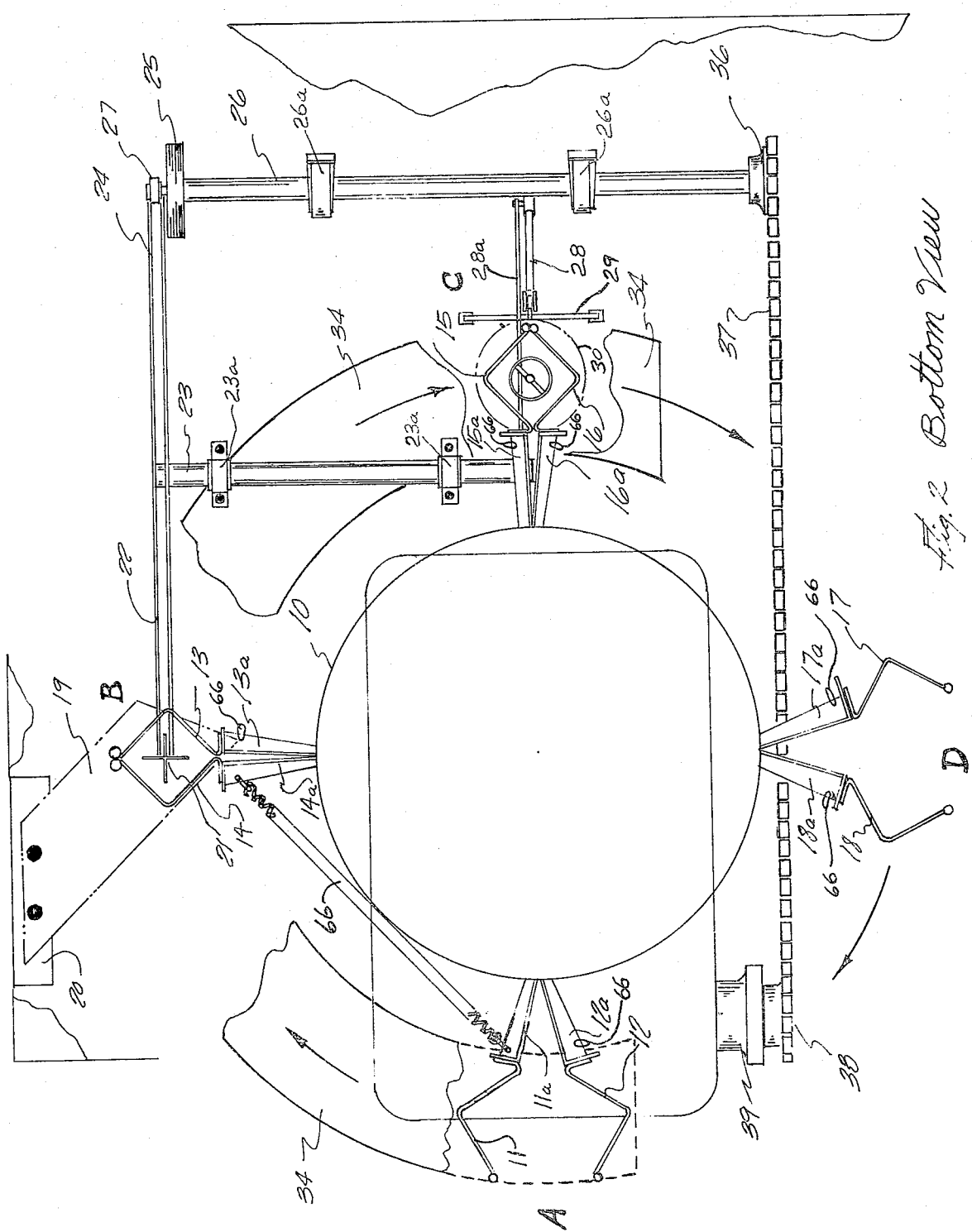
Fig. 2 Bottom View

APPARATUS FOR CORING CAULIFLOWER HEADS

DESCRIPTION OF THE INVENTION

This invention relates to an apparatus and method for trimming and coring of cauliflower heads and similar products.

An object of this invention is to provide an improved apparatus and method for removing the core portion from products such as cauliflower heads.

Another object of this invention is to provide improved apparatus for trimming and coring of products such as cauliflower heads, said apparatus being provided with a rotatable turret which carries a plurality of pairs of jaws that are adapted to receive the cauliflower heads in a sequence and carry the cauliflower heads through quartering and coring stations automatically during said sequence.

Other and further objects of this invention will be apparent to those skilled in the art to which it relates from the following specification, claims and drawing.

In accordance with this invention I have provided an economical and efficient machine for trimming and coring of products such as cauliflower heads so that these operations can be carried out in a time and labor-saving manner. This machine is provided with a rotatable turret that is equipped with a plurality of pairs of cauliflower headgripping jaws which are rotated in step-by-step fashion through a plurality of stations by a drive mechanism which is of the type disclosed in my prior U.S. Pat. No. 3,646,977. The jaws are open when they are presented at the loading station so that the operator can position a cauliflower head into the open jaws with the stem of the head facing upward. The jaws are then closed to grip the head and the turret moves the jaws to the quartering station and at the same time another pair of jaws is moved into position at the loading station to receive another cauliflower head. The head presented at the quartering station is cut into quarters by a set of blades inserted into the head from underneath. As the head is moved into the quartering station, the top portion of the stem is removed therefrom by a blade provided to the apparatus for this purpose. After a predetermined dwell at the quartering station the head is moved to the coring station by the turret drive mechanism. At the same time the next set of jaws which is loaded with a cauliflower head is moved into the quartering station. During the dwell of the first head in the coring station a rotatable coring device is lowered into the head from above and the core is removed by the rotating blades in the form of relatively thin shavings. Thereafter the cored head is moved by the turret drive mechanism to the unloading station and the next head is brought into the coring station. This sequence of operations as described above takes place automatically as long as the machine is driven by a suitable motor and cauliflower heads are loaded into the open jaws presented one after another at the loading station.

Further details and features of this invention will be set forth in the following specification, claims and drawing in which, briefly:

FIG. 1 is a side view of an embodiment of this invention with portions of the housing broken away to show details of construction thereof;

FIG. 1a is an enlarged view of the coring device employed in this invention;

FIG. 2 is a view looking upwards through the apparatus of this invention, portions of which are broken away to show the sequence of operation of the cauliflower headgripping jaws;

Figure 3:
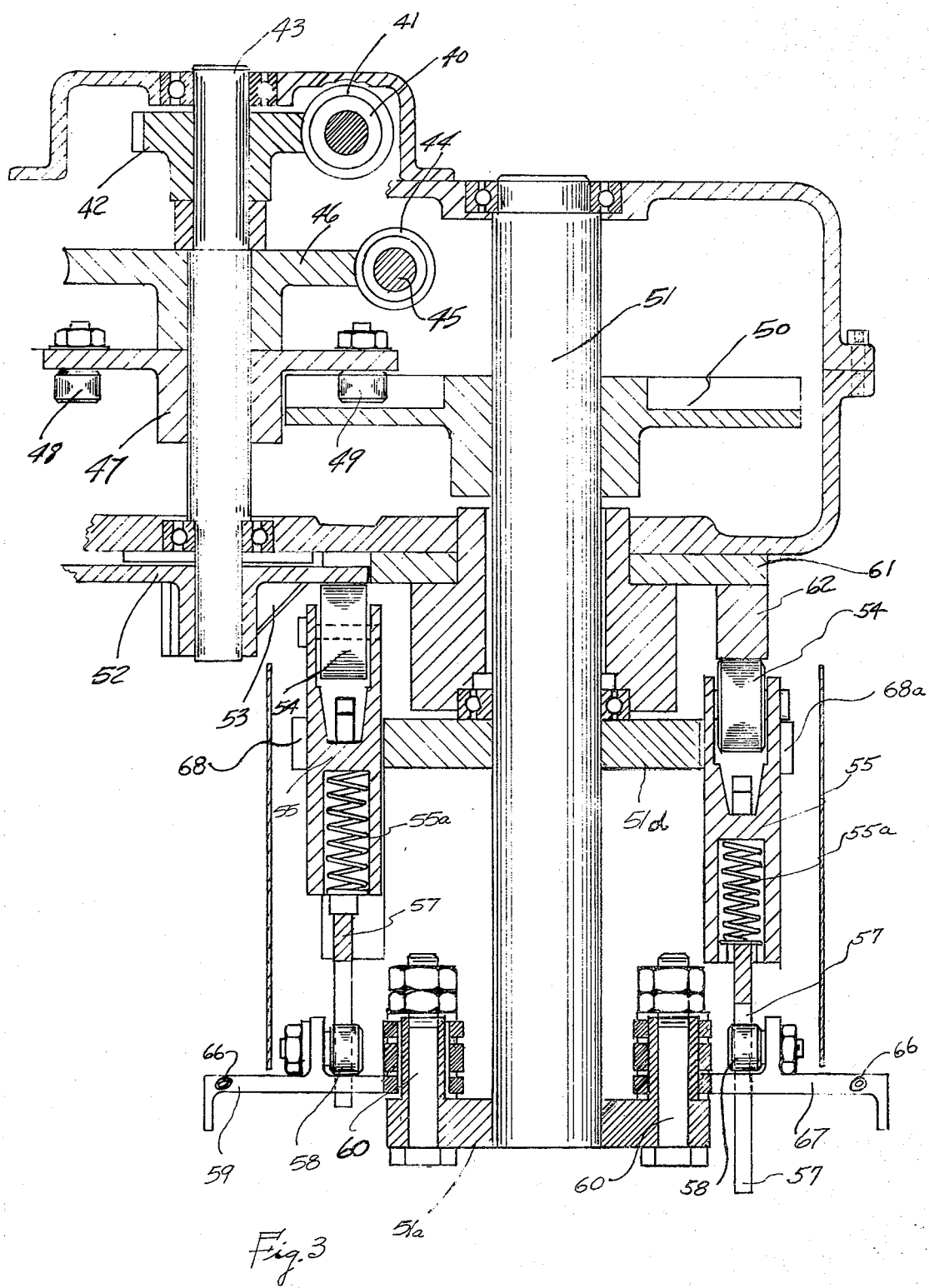
FIG. 3 is a vertical sectional view of the jawcarrying turret and the drive mechanism for rotating and operating the jaws.
Figure 5:
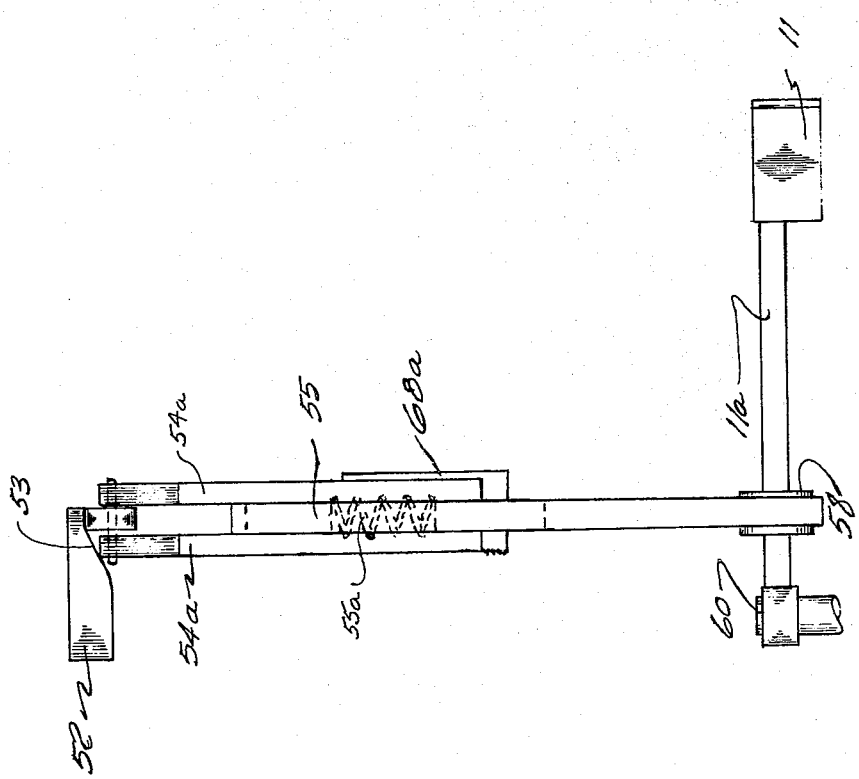
FIG. 5 is a side view of the mechanism shown in FIG. 4.

Referring to the drawing in detail, reference numeral 10 designates a housing which encloses a turret to which a plurality of jaws 11, 12, 13, 14, 15, 16, 17 and 18 for receiving the cauliflower heads are attached by arms 11a, 12a, 13a, 14a, 15a, 16a, 17a and 18a, respectively. These jaws are opened and closed in a predetermined sequence by the mechanism in housing 10 as they are rotated through the different stations A, B, C and D as will be described hereinafter. At station A the jaws are open to receive the cauliflower head which is gripped by the jaws. The gripped cauliflower head is then moved by the turret to station B.

As the cauliflower head is moved to station B, a portion of the stem is cut therefrom by the knife 19 which is supported by the frame of the apparatus. At station B the cross-shaped knife 21 is moved upward into the cauliflower head by the lever system including the levers 22, 22a and 24 and the knife 21 cuts the central part of the cauliflower head into quandrants. Levers 22 and 24 are fixedly attached to the shaft 23 which is supported on the frame by bearings 23a. The knife blade 19 which is located at position B may be either a stationary knife or it may be a circular blade driven by a motor (not shown) attached to the frame. Levers 22 and 24 and the shaft 23 which is attached to the levers by welding or the like, are rocked by the rod 27, the lower end of which is pivotally attached to the outer end of lever 24, and the upper end of which is attached by a suitable pivot pin to the eccentric 25 that is rotated by the shaft 26. Shaft 26 is supported on the frame by bearings 26a.

After the cauliflower head is quartered by the crossed blades 21 at station B, it is moved to station C at which the core of the cauliflower head is removed by a coring device 31 that is driven by the motor 30. The motor 30 is slidably supported at 29 so that it may be moved up and down by the rod 28 that is pivotally connected thereto.

Thus as the coring knives 32 and 33 which are attached to the sleeve of the device 31 and rotated by the motor 30, are advanced into the core of the cauliflower head and the core is removed in the form of relatively thin shavings. During the removal of the core the sleeve 31 supports the cauliflower head to keep it from collapsing between the jaws which engage the outside of the cauliflower head. At the same time, the cauliflower head is supported by the plate 34 which is attached to the frame and is positioned underneath the cauliflower head.

The motor and the coring device 31 are slidable up and down in the support 29. Rod 28, the upper end of which is connected by a pivot pin to the motor 30 and the lower end of which is connected to the lever 28a allows the motor 30 and coring device 31 to move downward as lever 28a swings downward so that the blades 31 and 32 of the coring device are lowered into the cauliflower head. Lever 28a swings up and down since the inner end thereof is fixedly attached to the shaft 23 which is fixedly attached to the lever 24. Shaft 23 is rotated back and forth by the eccentric 25 and lever 27. The eccentric 25 is fixedly attached to the shaft 26 which is provided with a sprocket 36 and is rotated by the chain drive 37. The chain drive 37 extends between the sprocket 36 and the sprocket 38 which is attached to the shaft 40. A gear 41 which meshes with the gear 42 is provided to the shaft 40. The gear 42 is fixedly attached to the shaft 43 and another gear 46 is also fixedly attached to this shaft. Gear 44 which is attached to the shaft 45 meshes with gear 46. Shaft 45 is provided with a sprocket 45a which is driven by the chain 69 that is provided between the sprocket 45a and a sprocket attached to the shaft of the motor 68. Thus the motor drives shafts 45, 43, 40 and 26 through the forementioned gears.

The Geneva cam actuator 47 is attached to the shaft 43 and the rollers 48 and 49 provided to this Geneva cam actuator alternately engage the cams of the Geneva cam 50 which is attached to the shaft 51. Thus, as the shaft 43 is rotated by the motor 68 the Geneva mechanism rotates the shaft 51 in step-by-step fashion and the pairs of cauliflower head-gripping jaws 11–12, 13–14, 15–16, and 17–18, are advanced step-by-step from the loading station A to the quartering station B, coring station C and releasing station D with a predetermined time dwell at each station sufficient to accomplish the operation desired at each station as described hereinafter.

The shaft 51 is provided with a turret member 51a at the lower end portion thereof and another turret member 51d in the midportion thereof. The cauliflower head-gripping jaws and supporting arms therefor are attached to turret member 51a. Thus, the turret member 51a is provided with either four or eight bolts such as those indicated at 60 and each bolt may be used to support one of the arms indicated by the reference numeral 59 to which a cauliflower head-gripping jaw is attached or the jaw supports may be arranged in pairs and each pair may be supported on the turret member 51a by one bolt. The eight arms 11a, 12a, 13a, 14a, 15a, 16a, 17a and 18a shown in FIG. 2 may therefor each be supported on the turret plate 51a by a separate pivoting bolt 60, or these arms may be arranged in pairs and each pair attached to plate 51a by one bolt. Each of the arms 59 is provided with an upstanding bracket to which a roller as indicated at 58 and 68 is attached by means of a suitable bolt supported bearing. On the other hand the rollers designated by reference numerals 58 and 58a surrounding portions of the arms 11a and 11b shown in FIG. 4 may be provided to the cauliflower-gripping means and four sets of these are, of course, provided on this apparatus when this type of gripping structure is used.

Figure 4:
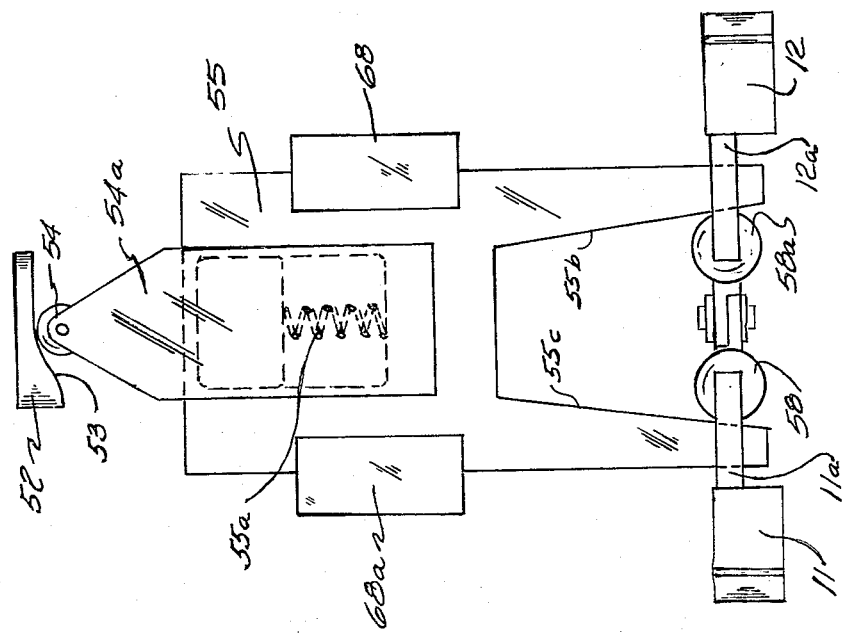
FIG. 4 is a front view of a pair of the cauliflower head-gripping jaws showing them in open position.

Rollers 58 and 58a are provided for actuating the various jaw-supporting arms. These rollers are aligned with the inclined surfaces 55c and 55b, respectively, of actuating member 55 as shown in FIG. 4. Four of these members are provided above the turret 51a slidably supported between members 68 and 68a which engage the sides thereof. The guides 68 and 68a are integral with plate 51d which is attached to the shaft 51. Thus, the jaw actuators 55 are rotatable simultaneously during the step-by-step rotation of this shaft.

Each of the members 55 is provided with inclined cam surfaces 55b and 55c which engage the rollers 58a and 58, respectively, of the jaw-supporting arms 11 and 12 as shown in FIG. 4. The upper part of the member 55 is provided with a roller 54 supported by member 54a to which the roller 54 is pivotally attached.

The housing 61 of the drive mechanism shown in FIG. 3 is provided with a cam 62 that extends about half way around the shaft 51 and the rollers 54 of the jaw closing mechanisms 55 ride on this cam as the jaws are carried through stations B and C so that the cauliflower head-gripping jaws are closed against the tension of the springs 66, as they are moved through these stations. Shaft 43 is provided with a cam 52 that is attached to the lower end of this shaft and this cam is provided with an inclined surface 53 which depresses the jaw closing members 55 to the level of cam 62 as will be described. Shaft 43 rotates the member 52 so that the inclined surface 53 engages the roller 54 and moves this roller downward so that the member 55 closes the jaws just after the jaws leave the loading station A and the jaws grip the cauliflower head placed therebetween as the cauliflower head is moved along the upper surface of the plate 34 shown in FIG. 2. Thus, when a jaw actuating member 55 is moved downward as the roller 54 is moved along the inclined surface 53, the inclined surfaces 55c and 55b engage the rollers 58 and 58a and swing the jaws into closed position against the tension of the coilsprings 66 which are provided between selected jaw-supporting arms. One coilspring 66 is provided between the jaw-supporting arms 11a and 14a, as shown in FIG. 2, a second such spring is provided between arms 13a and 15a, a third such spring is provided between arms 16a and 17a and a fourth spring of this type is provided between arms 12a and 18a. These springs exert sufficient tension so that the jaws are held open except when jaw-closing members 55 are pressed in downward position to close the jaws associated therewith to grip the cauliflower head, that is as the gripped head is moved through stations B and C. Thus, the jaws 11 and 12 are closed after the cauliflower head is placed therebetween since the roller 54 engages the inclined surface 53 as previously described and the roller rides on this inclined surface and is brought to the level of the cam surface 62 as the shaft 43 rotates the cam member 52. Roller 54 then leaves cam member 52 and rides on the under surface of the cam 62 while the jaws 11 and 12 move through stations B and C and after these jaws leave station C and approach station D the roller leaves the cam surface 62 and rides on a surface of the housing 61 so that the jaws 11 and 12 are allowed to be pulled open by the action of springs 66 whereupon the cauliflower head is released therefrom at station D.

While I have shown and described a preferred form of the invention, it will be understood that the invention is capable of variation and modification from the form shown so that the scope thereof should be limited only by the proper scope of the claims appended hereto.

What I claim is:

1. In apparatus for processing products having stems and cores such as cauliflower heads, the combination comprising means holding the product with the stem thereof exposed, a first knife mounted in a plane normal to the stem of the product, support means for bringing the product and first knife together for cutting the stem from the product, a segmenting knife for cutting the product into segments, support means for the segmenting knife moveable to drive the segmenting knife through the product in a direction towards and from the side of the product opposite the first knife while the first knife is adjacent the product whereby the first knife by being in intimate contact with the product will serve to prevent the product from moving in the direction of movement of the segmenting knife.

2. In apparatus for processing products having stems and cores such as cauliflower heads, the combination as set forth in claim 1 wherein said means for holding the product includes a plurality of spaced jaws, means for opening the jaws for receiving the product, and means for closing the jaws after the product is inserted to grip the product for processing.

3. In apparatus for processing products having stems and cores such as cauliflower heads, the combination as set forth in claim 2 including a rotatable turret supporting said jaws and means for rotating said turret first to a loading station with said jaws in spaced apart attitude to receive the product, means to cause the jaws to grip the product, and means causing movement of the product held in the jaws into engagement with the first knife.

4. In apparatus for processing products having stems and cores such as cauliflower heads, the combination as set forth in claim 3 including a coring means, and means to rotate the turret to move the product held in the jaws to a position for engagement by the coring means.

5. In apparatus for processing products having stems and cores such as cauliflower heads, the combination of a turret adapted to be rotated, a loading station, a segmenting and stemming station, a coring station and an unloading station, means connected with the turret for holding a product for progressive movement from station to station after being loaded thereon with the stem and exposed at the loading station, said segmenting and stemming stations comprising a first knife adapted to contact and sever the stem from the product and segmenting knife adapted to be moved through the product in a direction towards and from the opposite side of the product from the first knife while the first knife is in contact with the product to hold it against movement with the segmenting knife, the coring station comprising a flat plate on which the product rests and a coring means adapted for movement into the core of the product for removal of the core, and the unloading station comprising means allowing removal of the product from the apparatus.

* * * * *